United States Patent
Chiu et al.

(10) Patent No.: US 7,720,317 B2
(45) Date of Patent: May 18, 2010

(54) HANDHELD IMAGE-TRACKING DEVICE WITHIN RECTANGLE-SHAPED TWO-DIMENSIONAL SENSING ARRAY

(75) Inventors: Yen-Chen Chiu, Linkou Township, Taipei County (TW); Jin-Lin Liu, Fongyuan (TW)

(73) Assignee: Elan Microelectronics Corporation, Hsin-Chu (TW)

( * ) Notice: Subject to any disclaimer, the term of this patent is extended or adjusted under 35 U.S.C. 154(b) by 1062 days.

(21) Appl. No.: 11/363,050

(22) Filed: Feb. 28, 2006

(65) Prior Publication Data
US 2007/0029464 A1    Feb. 8, 2007

(30) Foreign Application Priority Data
Aug. 3, 2005    (TW) .................................. 94126385

(51) Int. Cl.
*G06K 9/22* (2006.01)
(52) U.S. Cl. .......................... 382/313; 702/104; 463/37; 345/159

(58) Field of Classification Search .................. 382/100, 382/312, 313, 314, 315; 702/47, 104; 463/37; 345/156, 158, 159, 163, 169, 173
See application file for complete search history.

(56) References Cited

U.S. PATENT DOCUMENTS

| | | | | |
|---|---|---|---|---|
| 3,976,973 | A * | 8/1976 | Martin et al. | 382/295 |
| 4,394,773 | A * | 7/1983 | Ruell | 382/124 |
| 6,614,422 | B1 * | 9/2003 | Rafii et al. | 345/168 |
| 7,038,659 | B2 * | 5/2006 | Rajkowski | 345/156 |
| 7,123,298 | B2 * | 10/2006 | Schroeder et al. | 348/273 |
| 7,158,122 | B2 * | 1/2007 | Roberts | 345/173 |
| 2004/0125072 | A1 * | 7/2004 | Gust | 345/156 |

* cited by examiner

*Primary Examiner*—Anand Bhatnagar
(74) *Attorney, Agent, or Firm*—Winston Hsu

(57) ABSTRACT

Because the back-and-forth movement by hand is slower and more strenuous than the leftward-and-rightward swinging, a handheld image-tracking device, which can be applied to an optical mouse or a handheld scanner, uses a rectangle-shaped sensing array to save area of the sensing array and lower down the production cost for the device by reasonably reducing the back-and-forth sensing area for the sensing array; and, so, an amount and time spent for a data comparison in the device is lessened.

4 Claims, 3 Drawing Sheets

HANDHELD IMAGE-TRACKING DEVICE WITHIN RECTANGLE-SHAPED TWO-DIMENSIONAL SENSING ARRAY

FIELD OF THE INVENTION

The present invention relates to a handheld image-tracking device; more particularly, relates to saving area for a sensing array in the device, reducing a production cost and an amount and time spent for a data comparison.

DESCRIPTION OF THE RELATED ART

A handheld image-tracking device of a prior art, such as an optical mouse, comprises a sensor with a square-shaped sensing array in the beginning, images of an object is captured rapidly and periodically according to the immediate frequency. Then, two sequential images are processed with a matching to find out similar parts for figuring out the displacement information.

Figure 3:
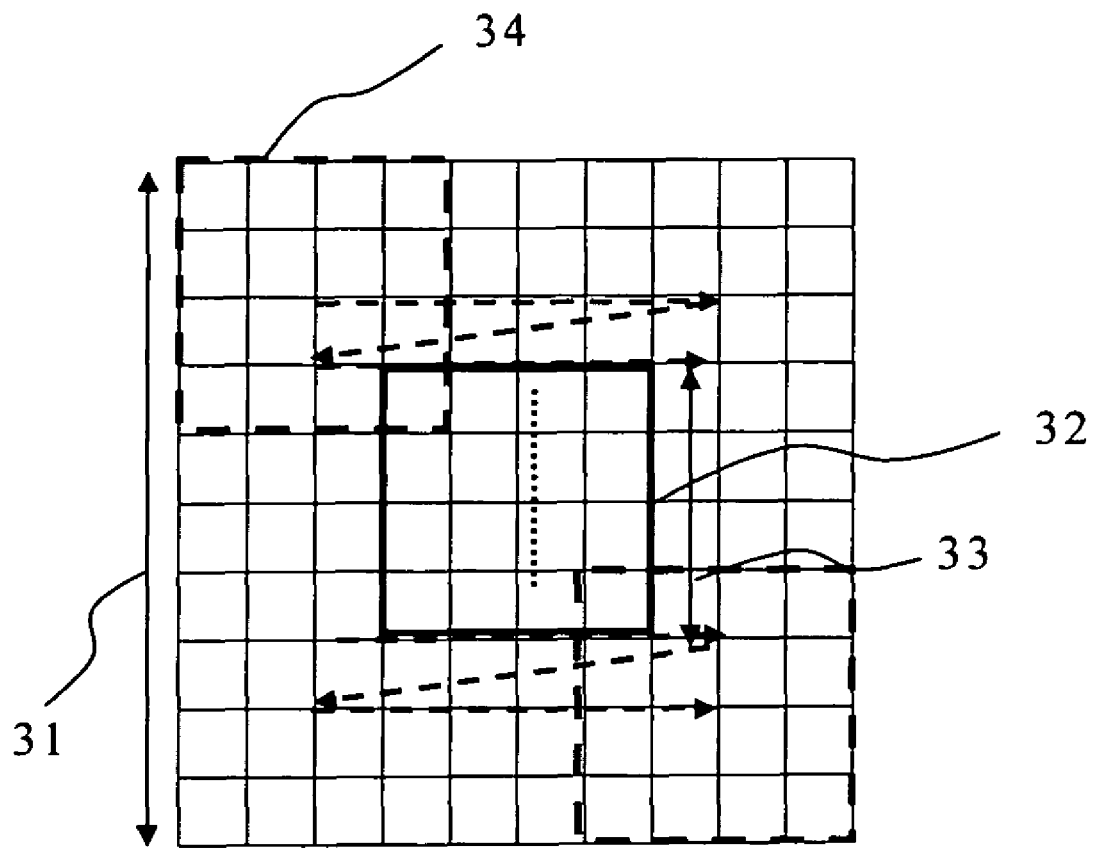

Please refer to FIG. 3, which is a view showing a square-shaped sensing array of the prior art. The side length <31> of the square-shaped sensing array is 10 pixels. At first, two sequential images at two time points are captured. In the image captured at the first time point, a base block <32> is defined at the center. The side length <33> of the base block <32> is 4 pixels. For processing a block matching algorithm and a full search, a sample block <34> with the same size as the base block <32> is defined in the image captured at the second time point. A matching is then processed in the second-time-point image with the sample block <34> from left to right and from top to bottom, which results in 49 sample blocks <34>. After the matching, a most similar to the base block <32> can be obtained.

Although the prior art can figure out the displacement information, the amount for data comparison is big; the process time is long; and the area for the sensing array is large. So, the prior art does not fulfill users' requests on actual use.

SUMMARY OF THE INVENTION

Therefore, the main purpose of the present invention is to save area for a sensing array in a sensing device and so to reduce a production cost for the sensing device and an amount and time spent for a data comparison in the sensing device.

To achieve the above purpose, the present invention is a handheld image-tracking device within a rectangle-shaped two-dimensional sensing array, which utilizes a rectangle-shaped two-dimensional sensing array with a first side length and a second side length shorter than the first side length to obtain displacement data after a matching through a block matching algorithm and a full search. Accordingly, a novel handheld image-tracking device with in a rectangle-shaped two-dimensional sensing array is obtained.

BRIEF DESCRIPTIONS OF THE DRAWINGS

Figure 1:
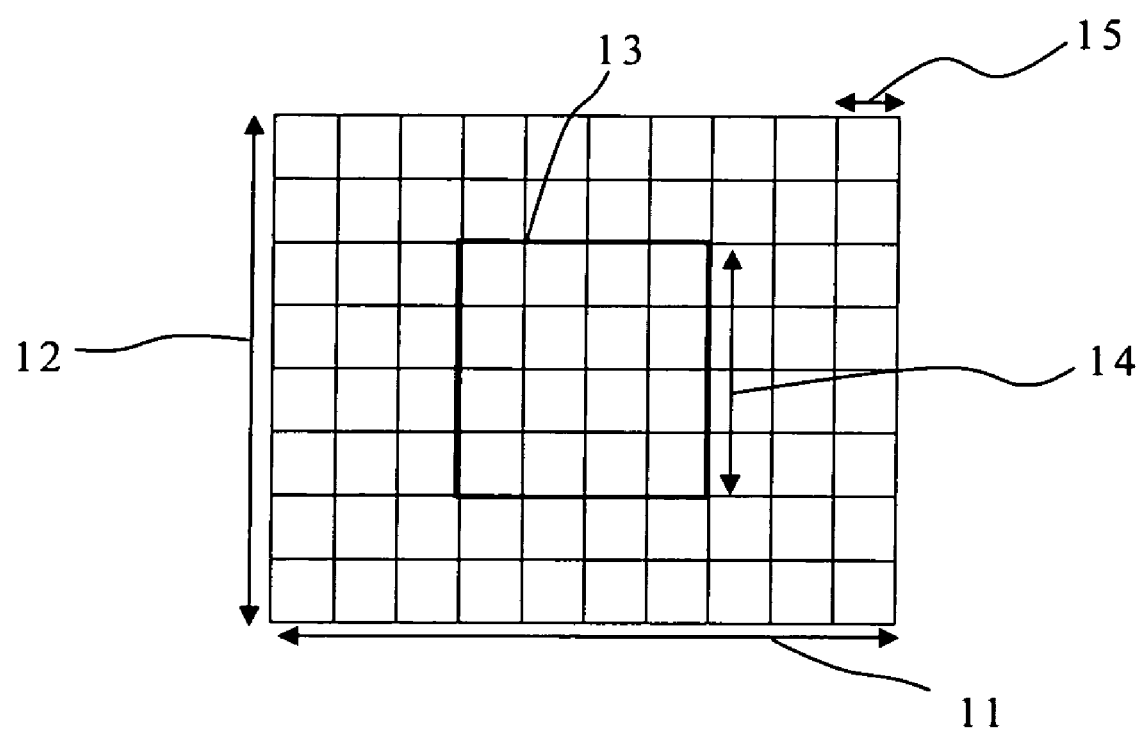
Figure 2:
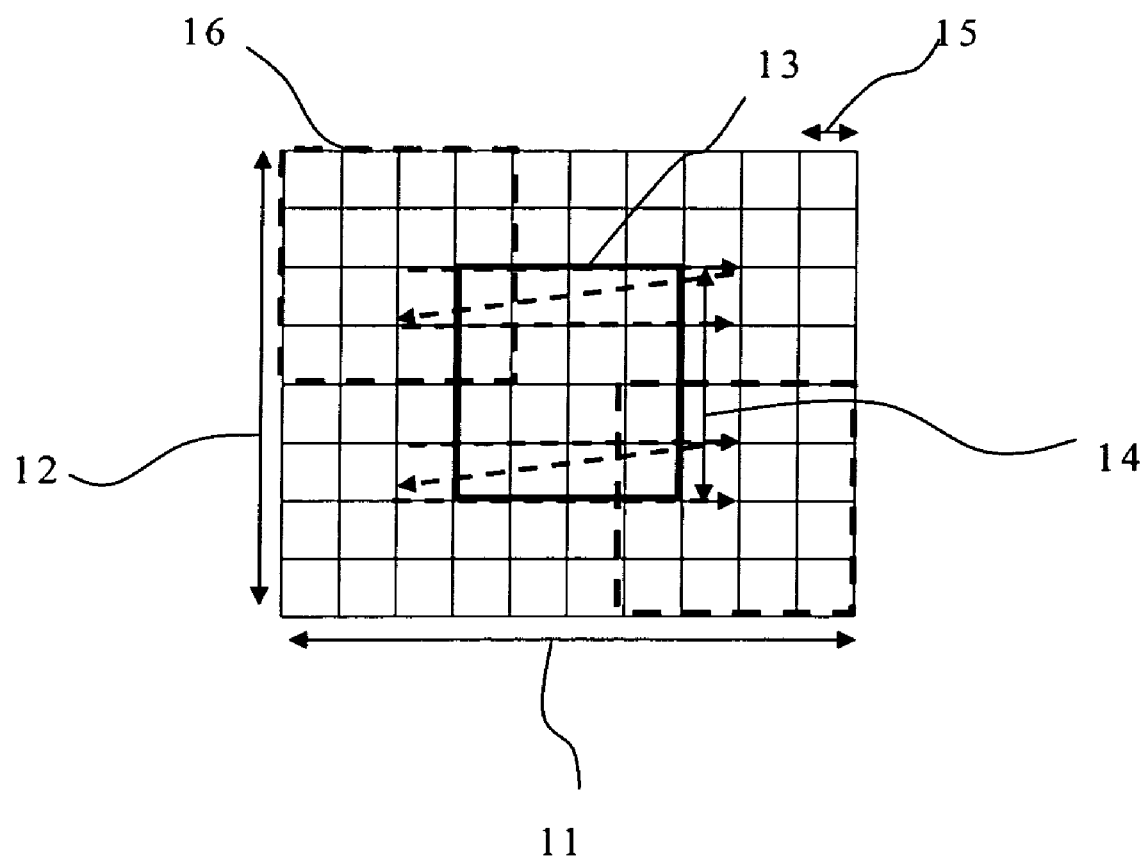

The present invention will be better understood from the following detailed description of the preferred embodiment according to the present invention, taken in conjunction with the accompanying drawings, in which FIG. 1 is a view showing a sensing array according to the present invention;

FIG. 2 is a view showing a preferred embodiment according to the present invention; and FIG. 3 is a view showing a square-shaped sensing array of a prior art.

DESCRIPTION OF THE PREFERRED EMBODIMENT

The following description of the preferred embodiment is provided to understand the features and the structures of the present invention.

Please refer to FIG. 1, which is a view showing a sensing array according to the present invention. As shown in the figure, the present invention is a handheld image-tracking device within a rectangle-shaped two-dimensional sensing array, where the sensing array comprises a first side length <11> [N] and a second side length <12> [M] shorter than the first side length <11> and so the rectangle-shaped two-dimensional sensing array is formed. The second side length <12> is calculated through a block matching algorithm and a full search, comprising steps of: (a) obtaining a base block <13> and a width <15> [w] for each pixel in the base block <13>; (b) calculating a maximum leftward-and-rightward sensing velocity $[V_{x\_max}]$ and a maximum back-and-forth sensing velocity $[V_{y\_max}]$ and (c) calculating the second side length <12> according to the first side length <11>. Therein, the base block <13> is a square with a side length <14> [k]. $V_{x\_max}$ is equal to $(N-K)/2 \times f \times w$, where f is an immediate frequency; and $V_{y\_max}$ is equal to $(M-K)/2 \times f \times w$. And, $V_{x\_max}$ is a maximum velocity for swinging a human's hand leftward and rightward; and $V_{y\_max}$ has a ratio [q] between 0 and 1 to $V_{x\_max}$ with the same sense of force regarding the maximum velocity for swinging a human's hand leftward and rightward. As a result, $V_{y\_max} = q \times V_{x\_max}$; that is to say, $(M-K)/2 \times f \times w = q \times (N-K)/2 \times f \times w$. So, the second side length <12> is equal to $Nq+K(1-q)$.

Please refer to FIG. 2, which is a view showing a preferred embodiment according to the present invention. As shown in the figure, a rectangle-shaped two-dimensional sensing array according to the present invention has a first side length <11> [N] of 10 pixels; a base block <13> in the sensing array has a side length <14> [k] of 4 pixels; and, a back-and-forth moving velocity in the the sensing array has a ratio [q] of 0.7 to a leftward-and-rightward moving velocity in the sensing array. The ratio is calculated through the following steps of: (a) acquiring a ratio of a back-and-forth moving velocity for a human's hand to a leftward-and-rightward moving velocity having the same sense of force to the human's hand regarding the back-and-forth moving velocity, which is 0.65; (b) acquiring a ratio of length to width for a computer monitor, which is 0.75; (c) and, obtaining a middle value for those two values (0.65 and 0.75), which is 0.7. Consequently, a second side length is calculated according to the rule obtained from the description for FIG. 1, which is $Nq+K(1-q)$. Through a substitution, a second side length 12 of 8 pixels is obtained.

Please further refer to FIG. 3, as a comparison to the prior art, the 10×8 rectangle-shaped sensing array has an area saving 20% to that of the 10×10 square-shaped sensing array. The pixels saved can be expressed as N−M, where $N-M=(1-q) \times (N-K)$. With a certain ratio of the back-and-forth moving velocity to the leftward-and-rightward moving velocity, the value of N−M is bigger and the pixels saved is greater when the first side length is longer or the side length of the base block is shorter.

Besides, the matching method for the rectangle-shaped two-dimensional sensing array is a full search, where the base block <13> with the side length <14> of 4 pixels is obtained and a sample block <16> of the same size to the base block <13> is used to obtain 35 sample blocks by a matching from left to right and from top to bottom. Thus, a data comparison for the rectangle-shaped two-dimensional sensing array according to the present invention is processed with fewer sample blocks than that for the square-shaped sensing array of the prior art, where a most similar block to the base block <13> can be obtained through the data comparison after the matching.

To sum up, the present invention is a handheld image-tracking device within a rectangle-shaped two-dimensional sensing array, which saves the area for a sensing array in a sensor and reduces a production cost and an amount and time for a data comparison.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A handheld image-tracking device within a rectangle-shaped two-dimensional sensing array, said sensing array comprising a first side length and a second side length, said second side length is obtained through a block matching algorithm and a full search comprising steps of:
    (a) obtaining a base block;
    (b) calculating a maximum leftward-and-rightward sensing velocity and a maximum back-and-forth sensing velocity, said maximum leftward-and-rightward sensing velocity being a maximum velocity for swinging a human's hand leftward and rightward, said maximum back-and-forth sensing velocity having a ratio to said maximum leftward-and-rightward sensing velocity with the same sense of force as said maximum velocity for swinging a human's hand leftward and rightward; and
    (c) calculating said second side length according to said first side length, said ratio between the back-and-forth moving velocity and the leftward-and-rightward moving velocity, and one side length of the base block.

2. The device according to claim 1, wherein said ratio has a value between 0 and 1.

3. The device according to claim 1, wherein said base block is a square.

4. The device according to claim 1, wherein the step (c) comprises:
    calculating said second side length according to the ratio between the maximum back-and-forth sensing velocity and the maximum leftward-and-rightward sensing velocity, and two formulae that the maximum back-and-forth sensing velocity is proportional to a difference between the second side length and one side length of the base block, and the maximum leftward-and-rightward sensing velocity is proportional to a difference between the first side length and one side length of the base block.

* * * * *